US010732427B2

(12) United States Patent
Wall et al.

(10) Patent No.: US 10,732,427 B2
(45) Date of Patent: Aug. 4, 2020

(54) EYE-TRACKING SYSTEM POSITIONING DIFFRACTIVE COUPLERS ON WAVEGUIDE

(71) Applicant: Microsoft Technology Licensing, LLC, Redmond, WA (US)

(72) Inventors: Richard Andrew Wall, Kirkland, WA (US); Joseph Daniel Lowney, Bothell, WA (US); Dmitry Reshidko, Redmond, WA (US); Ian Anh Nguyen, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 95 days.

(21) Appl. No.: 15/818,668

(22) Filed: Nov. 20, 2017

(65) Prior Publication Data
US 2019/0155046 A1    May 23, 2019

(51) Int. Cl.
  *G02B 27/42* (2006.01)
  *G02B 26/08* (2006.01)
  (Continued)

(52) U.S. Cl.
  CPC ......... *G02B 27/425* (2013.01); *G02B 5/1819* (2013.01); *G02B 6/0016* (2013.01);
  (Continued)

(58) Field of Classification Search
  CPC ...... G02B 6/00; G02B 27/0093; G02B 27/01; G02B 27/42
  See application file for complete search history.

(56) References Cited

U.S. PATENT DOCUMENTS 9,001,030 B2 * 4/2015 Raffle ............... G02B 27/00
                                                   345/156
2009/0097122 A1 * 4/2009 Niv .................. G02B 5/1866
                                                   359/575
(Continued)

FOREIGN PATENT DOCUMENTS

WO    2016135375 A1    9/2016

OTHER PUBLICATIONS

"International Search Report and Written Opinion Issued in PCT Application No. PCT/US2018/059916", dated Feb. 25, 2019, 14 Pages.

*Primary Examiner* — Brian T Pendleton
*Assistant Examiner* — Kyle M Lotfi
(74) *Attorney, Agent, or Firm* — Alleman Hall Creasman & Tuttle LLP

(57) ABSTRACT

An eye-tracking system includes an at least partially transparent visible light waveguide having a visible light display region configured to emit visible light to an eye of a user. A light source is configured to emit at least infrared (IR) light that travels along an IR light path to the eye of the user. A microelectromechanical system (MEMS) projector positioned in the IR light path directs the IR light. At least one diffractive input coupler on an input end of the IR light path downstream of the MEMS projector diffracts at least a portion of the IR light. At least one diffractive output coupler positioned in the IR light path downstream of the diffractive input coupler receives the IR light and directs the IR light toward the eye. At least one sensor is configured to receive the IR light after being reflected by the eye.

19 Claims, 11 Drawing Sheets

(51) Int. Cl.

| | |
|---|---|
| *G02B 27/01* | (2006.01) |
| *G02B 27/00* | (2006.01) |
| *G02B 5/18* | (2006.01) |
| *F21V 8/00* | (2006.01) |
| *G06F 3/01* | (2006.01) |
| *G06K 9/00* | (2006.01) |
| *G06T 7/00* | (2017.01) |

(52) U.S. Cl.
CPC ......... *G02B 6/0035* (2013.01); *G02B 6/0076* (2013.01); *G02B 26/0833* (2013.01); *G02B 27/0093* (2013.01); *G02B 27/0172* (2013.01); *G02B 27/0179* (2013.01); *G06F 3/013* (2013.01); *G06K 9/00604* (2013.01); *G06T 7/0012* (2013.01); *G02B 2027/0123* (2013.01); *G02B 2027/0138* (2013.01); *G02B 2027/0187* (2013.01); *G06T 2207/30041* (2013.01)

(56) References Cited

U.S. PATENT DOCUMENTS

| | | | |
|---|---|---|---|
| 2011/0109528 A1 | 5/2011 | Mun et al. | |
| 2013/0314793 A1* | 11/2013 | Robbins | G02B 5/18 359/573 |
| 2014/0140654 A1* | 5/2014 | Brown | G02F 1/29 385/10 |
| 2015/0185475 A1* | 7/2015 | Saarikko | G02B 6/02085 382/117 |
| 2016/0085300 A1* | 3/2016 | Robbins | G06F 3/013 345/633 |
| 2016/0349514 A1* | 12/2016 | Alexander | G06F 3/013 |
| 2016/0349516 A1 | 12/2016 | Alexander et al. | |
| 2018/0032030 A1* | 2/2018 | Kim | G02B 6/0076 |
| 2018/0120566 A1* | 5/2018 | Macnamara | G02B 6/0076 |
| 2018/0286320 A1* | 10/2018 | Tardif | G09G 3/346 |
| 2019/0011708 A1* | 1/2019 | Schultz | G02B 6/34 |
| 2019/0041634 A1* | 2/2019 | Popovich | G01S 17/66 |

* cited by examiner

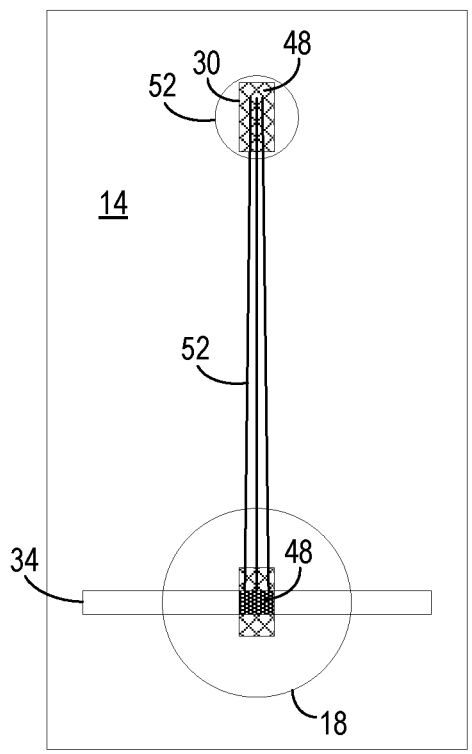
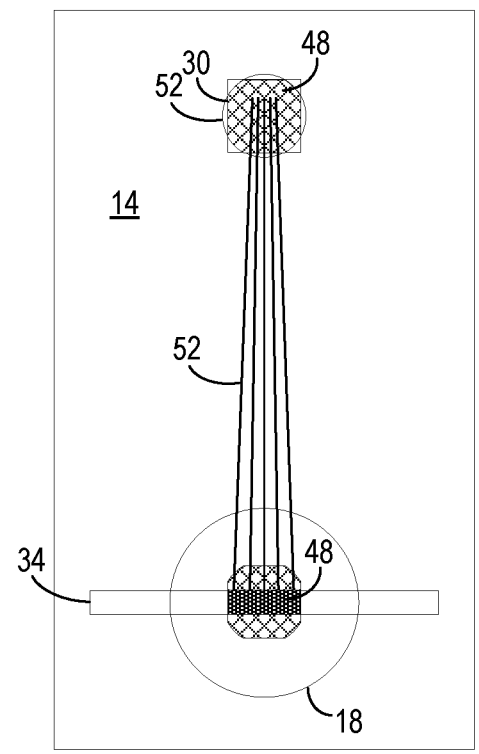
FIG. 5A        FIG. 5B
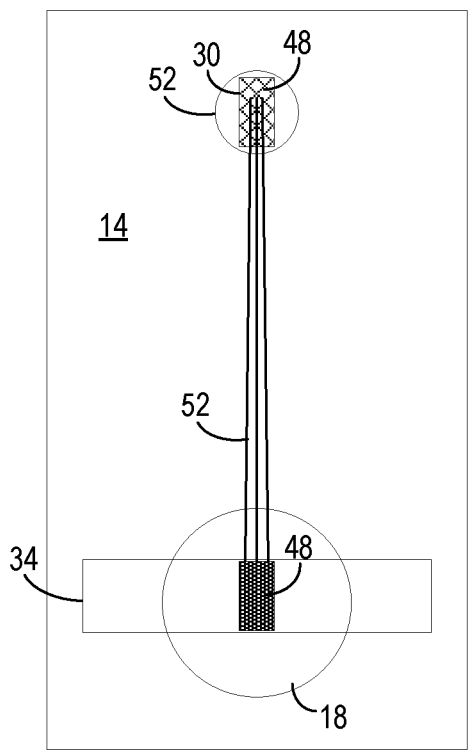
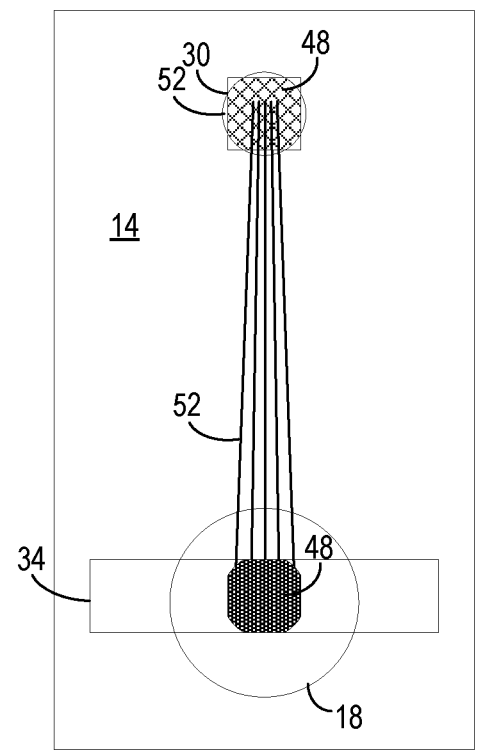
FIG. 5C        FIG. 5D

US 10,732,427 B2

EYE-TRACKING SYSTEM POSITIONING DIFFRACTIVE COUPLERS ON WAVEGUIDE

BACKGROUND

In a wearable device such as a head-mounted display (HMD) device, tracking the positions of the eyes of a user can allow the HMD device to estimate the direction of a user's gaze. Gaze direction can be used as an input to a program that controls the display of images on the HMD. In order to determine the position and gaze of the user's eye, an eye-tracking system may be added to the HMD device. However, developing eye-tracking systems for HMD devices presents a number of technical and practical problems. Eye-tracking systems can add weight, involve large optical components, and require extra processing power. From a user's point of view, the eye-tracking system may create obstructions to the field of view, emit too much light near the user's eye, and cause other optical complications.

SUMMARY

An eye-tracking system is provided. The system may include an at least partially transparent visible light waveguide having a visible light display region configured to emit visible light to impinge upon an eye of a user. A light source may be configured to emit at least infrared (IR) light that travels along an IR light path to impinge upon the eye of the user. A microelectromechanical system (MEMS) projector may be positioned in the IR light path and configured to direct the IR light along the IR light path. At least one diffractive input coupler may be on an input end of the IR light path downstream of the MEMS projector to diffract at least a portion of the IR light directed by the MEMS projector. At least one diffractive output coupler may be positioned in the IR light path downstream of the at least one diffractive input coupler to receive the portion of the IR light from the at least one diffractive input coupler and direct the portion of the IR light along the IR light path toward the eye. At least one sensor may be configured to receive the IR light after being reflected by the eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5D are diagrams of several configurations of the diffractive input coupler in relation to the diffractive output coupler as positioned on the waveguide from a front view, the IR light path represented schematically from the input coupler to the output coupler.

DETAILED DESCRIPTION

The inventors have recognized that conventional eye-tracking systems may add extraneous bulk, weight, and design complications to the devices for which they are engineered. Optical complications may arise for the user and installing eye-tracking in display devices such as head-mounted display (HMD) devices may affect the costliness of the device, especially where optical relays requiring many components are involved. Optimizing a user's viewing experience while also providing an efficient and effective design for eye-tracking is a target for engineers that often involves trade-offs. In response to these issues, the systems and methods described herein have been developed to provide an evolved design for use in applications that utilize eye-tracking.

Figure 1:
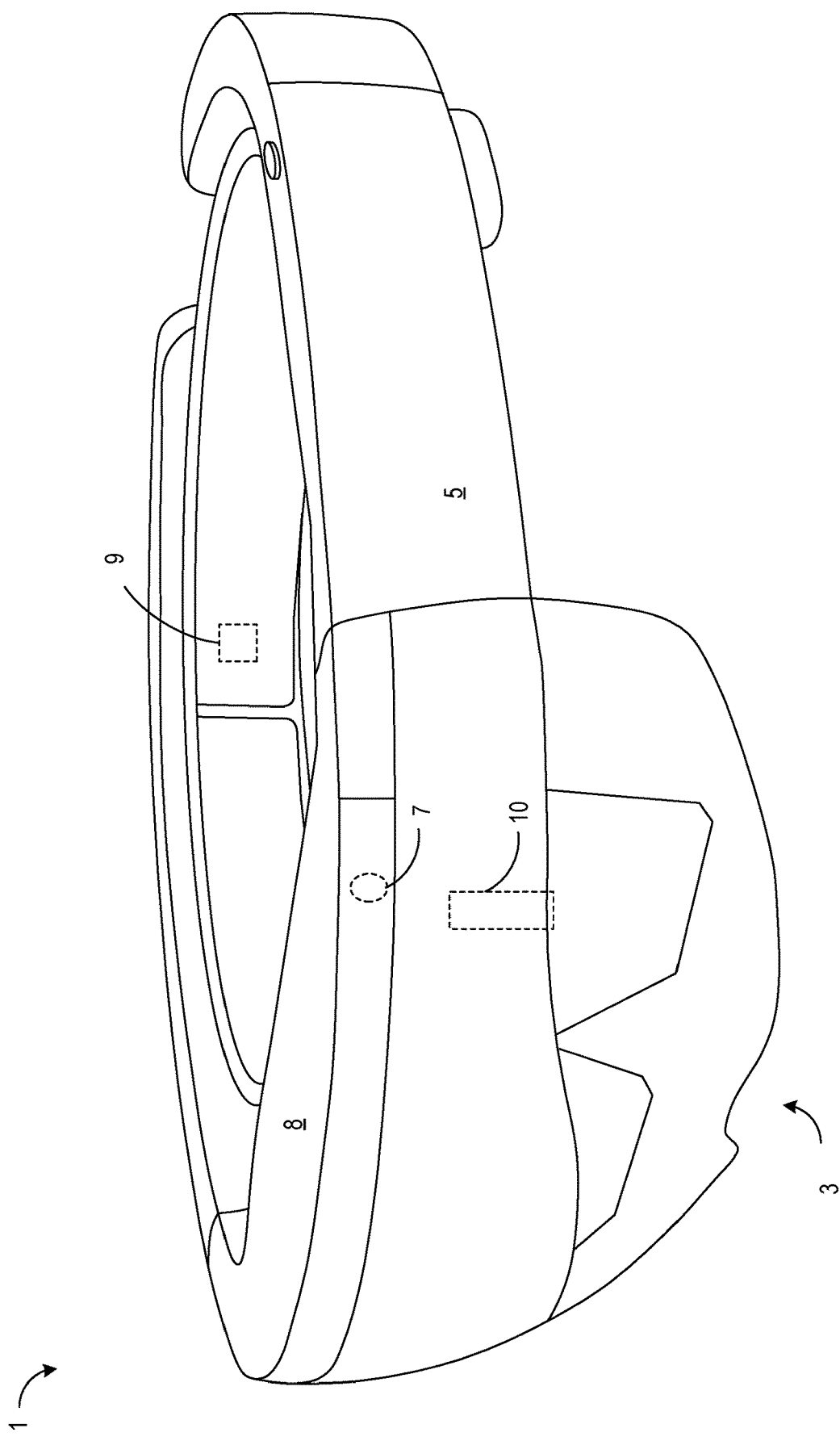
FIG. 1 shows a side perspective view of a head mounted display (HMD) device with an eye-tracking system.

FIG. 1 shows a side perspective view of an HMD device 1 with an eye-tracking system. In the example of FIG. 1, the HMD device 1 includes a display device 3 and a frame 5 that wraps around the head of a user to position the display device 3 close to the user's eyes when providing a virtual reality or mixed reality experience to the user. Any suitable display technology and configuration may be used to display images via the display device 3. For a virtual reality experience, the display device 3 may be an opaque Light-Emitting Diode (LED) display, a Liquid Crystal Display (LCD), direct scanning with a microelectromechanical system (MEMS) as a display, or any other suitable type of opaque display. In some cases, outwardly facing cameras 7 may be provided that capture images of the surrounding environment, and these captured images may be displayed on the display along with computer generated images that augment the captured images of the real environment. For a mixed or augmented reality experience, the display device 3 may be at least partially transparent so that the user of the HMD device 1 may view a physical, real-world object in the physical environment through one or more partially transparent pixels displaying virtual object representations. For example, the display device 3 may include image-producing elements such as, for example, a transparent Organic Light-Emitting Diode (OLED) display or a MEMS used in conjunction with waveguides.

The frame 5 may further support additional components of the HMD device 1, including a processor 8, an inertial measurement unit (IMU) 9, and an eye-tracking system 10. The processor 8 may include logic and associated computer memory configured to receive sensory signals from the IMU 9 and other sensors, to provide display signals to the display device 3, to derive information from collected data, and to enact various control processes described herein.

Figure 2A:
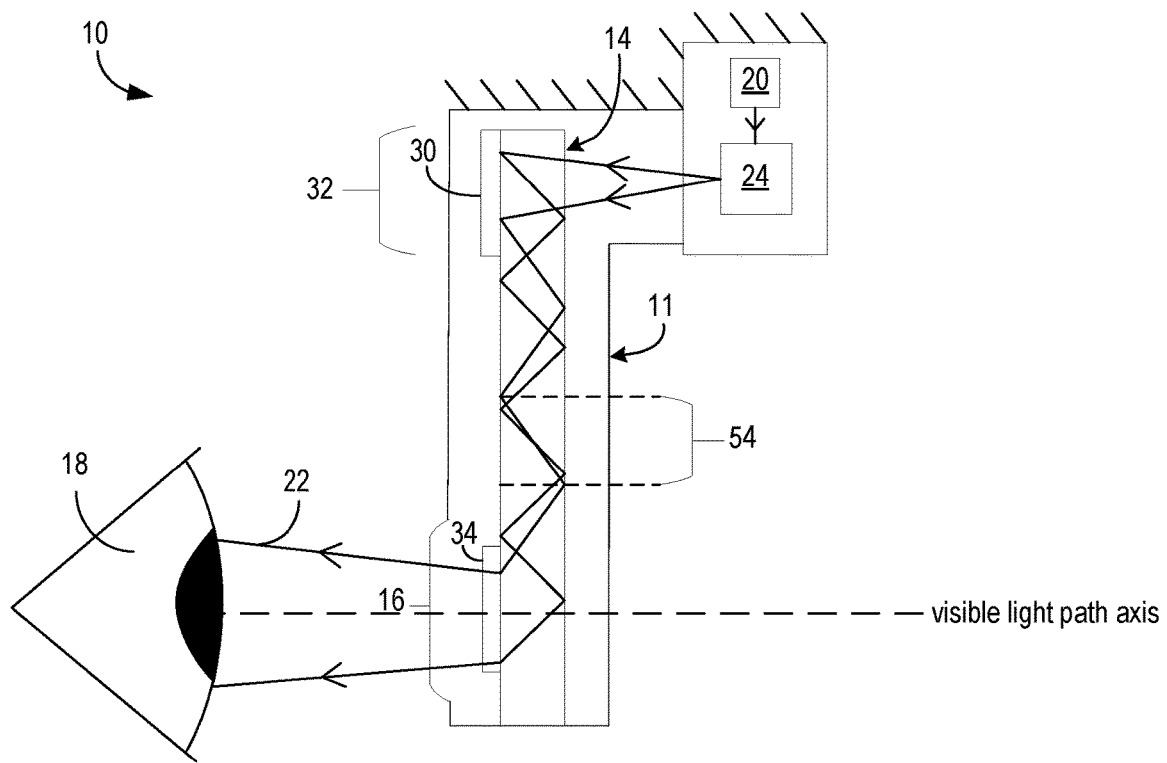
FIG. 2A is a simplified illustration of a side-view of a first implementation of the eye-tracking system of FIG. 1, where an IR light path traverses a waveguide from a light source on an opposite side of a display region from the eye of the user.

Turning to FIG. 2A, the eye-tracking system 10 may include an at least partially transparent visible light (VL) waveguide 14 having a visible light display region 16 configured to emit visible light to impinge upon an eye 18 of a user. At VL display region 16, light from the VL waveguide 14 may be emitted to the eye 18 of the user to create an augmented or fully virtual reality display to the user. The system 10 may include a light source 20 configured to emit at least infrared (IR) light that travels along an IR light path 22 to impinge on the eye 18 of the user. The light source 20 may be a laser module that includes a plurality of individual lasers, such as an IR laser and visible light lasers, each laser respectively being configured to emit a respective frequency of light. It will be appreciated that the IR light and visible light may or may not have similar emission points from their respective sources. The lasers that may serve as the VL and IR light emission sources may be packaged together and oriented in light source 20 to emit light at least initially along a coincident light path.

The system 10 may also include a microelectromechanical system (MEMS) projector 24 positioned in the IR light path 22 and configured to direct the IR light along the IR light path 22. The initially coincident light path may proceed from the MEMS projector 24 until the light reaches a diffractive input coupler 30, which may be configured to in-couple IR light at input end 32 to the VL waveguide 14, directing the IR light along IR light path 22. The visible light providing the display to the user may also be coupled to the VL waveguide 14, although the coupling system for visible light may be optically and spatially separate from the diffractive input and output couplers 30, 34 that are configured for coupling IR light.

FIG. 2A additionally indicates by outline a mounting structure 11 for the system 10, which may be an at least partially transparent plastic or other appropriate material configured to mount the components of system 10 to each other, and to the HMD device 1. For simplicity, a mounting structure 11 is not included in all figures. The mounting structure 11 may be used to integrate the eye-tracking system 10, for example, within an HMD device 1 or other augmented reality lens system. It will be appreciated that the waveguides, diffractive couplers, and other optical components may be connected via optically clear adhesive (OCA) or by using other optically permissive adhesives and/or structures.

One potential advantage of the configurations described herein is that the MEMS projector 24 used to create the display for the user may also provide eye-tracking with only a few additional components including an IR light source. FIG. 2A shows one possible implementation of the IR light path, as follows. IR light may be emitted from the light source 20 to the MEMS projector 24 positioned in the IR light path 22. The MEMS projector 24 may be configured to direct the IR light along the IR light path 22. The IR light path 22 may traverse a portion of the VL waveguide 14 as shown in FIG. 2A. At least one diffractive input coupler 30 may be on an input end 32 of the IR light path 22 downstream of the MEMS projector 24 to diffract at least a portion of the IR light directed by the MEMS projector 24. The IR light may then be guided by the VL waveguide 14 through the body of the VL waveguide 14. At least one diffractive output coupler 34 may be positioned in the IR light path 22 downstream of the at least one diffractive input coupler 30 to receive the portion of the IR light from the at least one diffractive input coupler 30. The diffractive output coupler 34 may direct the portion of the IR light along the IR light path 22 toward the eye 18. The IR light in the VL waveguide 14 may out-couple via the diffractive output coupler 34, at which point the IR light may be emitted and directed toward the eye 18. The diffractive output coupler 34 may be positioned at or in proximity to the visible light display region 16 that is configured to emit visible light to impinge on the eye 18 of the user as shown in FIG. 2A, thus providing a display to the user.

FIG. 2A also shows a visible light path axis connecting the eye 18 of the user and the display region 16. In some of the implementations that follow, the IR light enters the eye 18 on-axis relative to the axis of the visible light emitted from the visible light waveguide 14 as it impinges on the eye 18. Alternative configurations will also be discussed. An approximate angular range for field-of-view in eye-tracking may be 200-300, and possibly up to 400 in the horizontal direction. For the purposes of this description, on-axis relative to the visible light emitted from display region 16 of the waveguide will refer to configurations where the central axis of the IR light path 22 is within plus or minus 20 degrees of the display region axis, which is perpendicular to an emissive surface of the display region 16, with a preferred range of plus or minus 5 degrees. A potential advantage of the IR light entering the eye 18 on-axis is that the most information may be provided for eye-tracking. Also, there may be no significant impact to see-through visibility for the user from the utilization of VL waveguide 14 and diffractive couplers 30, 34 in this arrangement. However, it will be appreciated that the IR light may also enter the eye 18 off-axis relative to the visible light axis. This will be further discussed in some example configurations.

Figure 9:
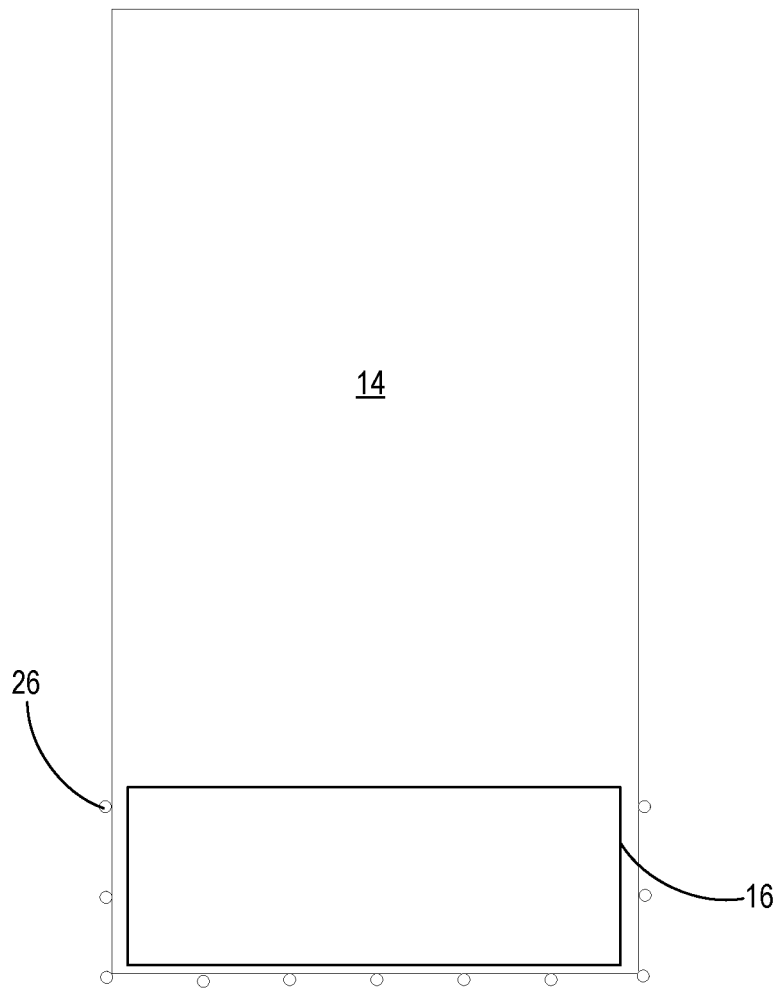
FIG. 9 is a front-view of one implementation of the sensors positioned around the display region.

It will be appreciated that light incident upon the eye 18 is reflected from the eye 18 by way of reflective biological structures within the eye 18. As the eye 18 moves, the direction of reflected light changes predictably. If the axis of the light passing into the eye 18 is known, as it is in the implementations described herein, the orientation of the light reflected out of the eye 18 may be calculated. Conversely, if the nature of the light incident upon the eye 18 is known and the reflected light is measured, the location and orientation of the eye 18 may be inferred algorithmically. Using these relationships, the system 10 directs IR light to be incident on the eye 18 in a predetermined pattern that is created using the MEMS projector 24. The system 10 subsequently senses the position of light reflected from the eye 18 to determine eye position, and hence gaze direction. In addition, an eye-tracking system may allow capturing an image of the user's iris by recording the diffuse scattered light from the eye 18. Image analysis of the iris enables a user authentication feature. To provide this sensing functionality, the system 10 may include at least one sensor 26 configured to receive the IR light after being reflected by the eye 18. As shown in FIG. 9, the sensor 26 may be positioned at one or more locations around the display region 16. Typically, the sensor is comprised of a plurality of light sensing devices that may each contain one or more spatially separated detectors (pixels).

Figure 2B:
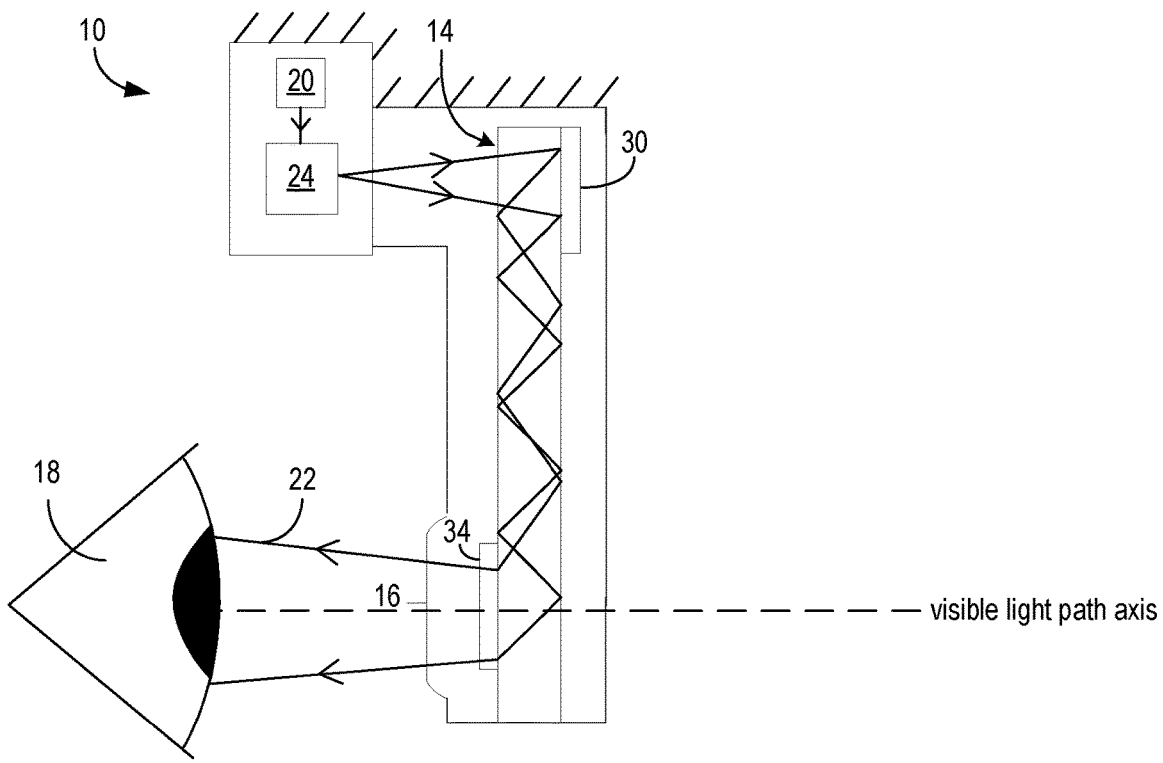
FIG. 2B is a simplified illustration of a side-view of a second implementation of the eye-tracking system of FIG. 1, where an IR light path traverses a waveguide from a light source on a same side of a display region as the eye of the user.

Returning to FIG. 2A, the light source 20 may be positioned on an opposite side of the display region 16 from the eye 18 of the user, and a portion of the IR light path 22 may traverse a portion of the visible light waveguide 14. Alternatively, as shown in FIG. 2B, the light source 20 may be positioned on a same side of the display region 16 as the eye 18 of the user; given this arrangement, a portion of the IR light path 22 may also traverse a portion of the visible light waveguide 14.

An IR light beam 52 in the system 10 has an angular bandwidth dependent on the range of angles of the IR light path 22 that are allowed to pass through the waveguide and impinge on the eye 18. The angular bandwidth may influence the eye-tracking algorithms employed by the system 10. FIG. 2A schematically depicts the IR light path 22 within the visible light waveguide 14, the IR light rays separated vertically by reflecting at different angles within the VL waveguide 14. One feature affecting the angular bandwidth is the step size 54, shown in FIG. 2A as the distance between consecutive reflections of the IR light within the waveguide. At the diffractive input coupler 30, which is one point of angular bandwidth control, shorter diffraction grating periods may enable more angles of light to be in-coupled to the waveguide, but increase the step size of the IR light beam propagation within the waveguide. At the diffractive output coupler 34, the range of angles of IR light that couples with the diffractive output coupler 34 also influences the angular bandwidth of the IR light beam 52.

Figure 4A:
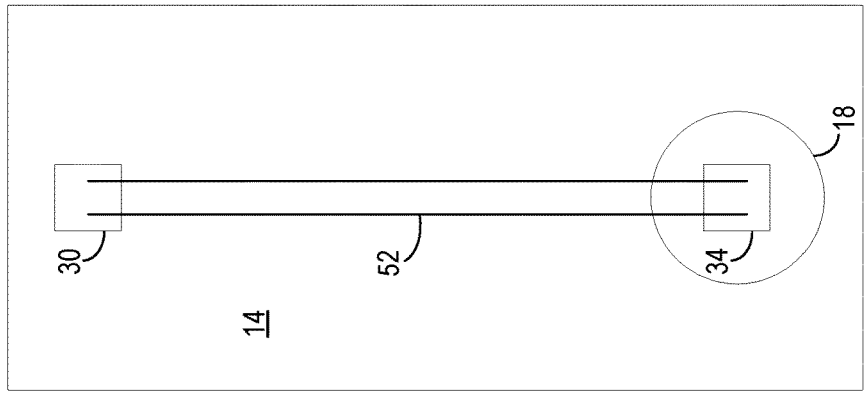
FIGS. 4A-4D are diagrams of several configurations of the diffractive output coupler positioned on the waveguide from a front view, the IR light path represented schematically from the input coupler to the output coupler.

FIGS. 4A-4D present front views of several configurations of the VL waveguide 14 and the diffractive input and output couplers 30, 34. In each figure, the angular bandwidth of the IR light beam 52 may be restricted or expanded by the cross-sectional area of the diffractive input and output couplers 30, 34. For example, FIG. 4A shows a basic configuration where a single diffractive output coupler 34 has a cross-sectional area similar to that of a single diffractive input coupler 30. It will be appreciated that other configurations may include multiple diffractive input and/or output couplers. In this general configuration of FIG. 4A, employing shorter diffraction grating periods may enable more field angles to in-coupled at the diffractive input coupler 30, although as a result the step size 54 may also increase within the VL waveguide 14. A large step size 54 may cause large fluctuations in optical efficiency as a function of field angle, possibly limiting the fidelity of eye-tracking algorithms and detracting from eye-tracking functionality. However, a smaller step size 54 may result in loss of angular data from beam replication within the diffractive output coupler 34. Calibration routines may be used to partially recover angular data; however, this trade-off in efficiency and data loss with step size may be significant to the design of the system 10.

Figure 4B:
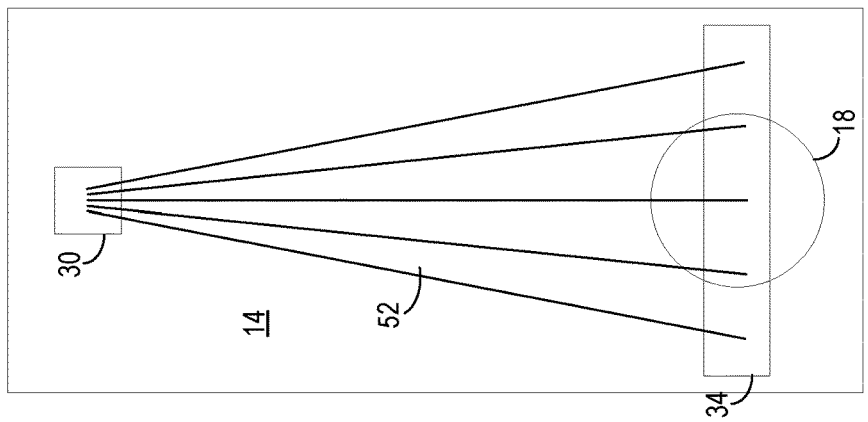

Overall, the configuration shown in FIG. 4A may support relatively smaller angular bandwidth. To address this potential shortcoming, the diffractive output coupler 34 may extend in a horizontal direction across the visible light waveguide 14 as shown in FIG. 4B. In this arrangement, horizontal angular bandwidth may be increased after the portion of the IR light passes through the diffractive output coupler 34, compared to the arrangement shown in FIG. 4A where the diffractive output coupler 34 does not extend in a direction perpendicular to the visible light waveguide 14. One potential advantage of this configuration is that the spatial location of the source of light as it is directed from the diffractive output coupler 34 to the eye 18 may vary as a function of horizontal field angle thus supporting larger horizontal bandwidth; this may be an asset for certain eye-tracking algorithms if properly accounted for in the algorithms. Additionally, the horizontal angular bandwidth may be increased in this configuration without increasing beam replication, beam replication being limited to the vertical dimension in the figure as shown. The inventors recognize that some trade-offs may be relevant in this design, due to efficiency, tolerance requirements, grating sizes, and potential ghost images.

Figure 4C:
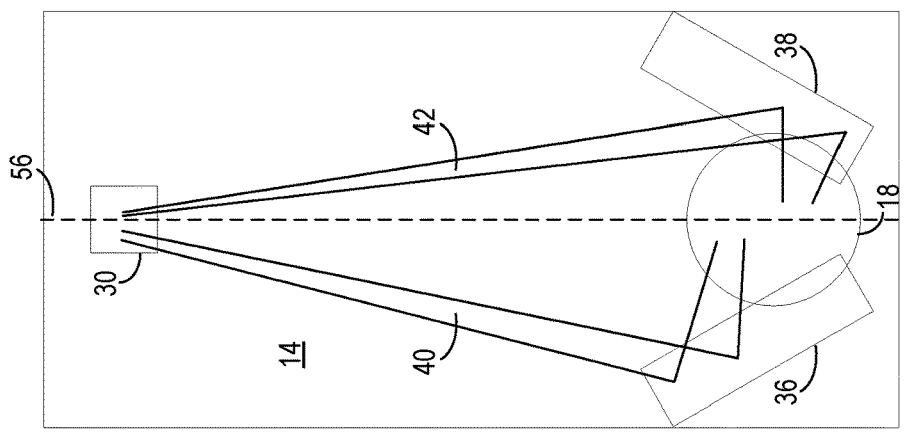

As another potential solution to these considerations, the at least one diffractive output coupler 34 may be a first diffractive output coupler 36, and a second diffractive output coupler 38 may be composed with the first diffractive output coupler 36. An example implementation of this configuration is shown in FIG. 4C. The first and second diffractive output couplers 36, 38 may occupy a plane, a first end of each diffractive output coupler 36, 38 proximate to a center axis 56 of the visible light waveguide 14. A second end of each diffractive output coupler 36, 38 may be rotated at an angle to the center axis 56 of the visible light waveguide 14. In this arrangement, the horizontal angular bandwidth and vertical angular bandwidth may be increased after the portion of the IR light passes through the first and second diffractive output couplers 36, 38. As a contrasting example, were the diffractive output couplers 36, 38 not rotated but parallel to the center axis 56 of the visible light waveguide 14, vertical angular bandwidth may be increased but at the cost of horizontal angular bandwidth. One potential advantage of this configuration is that the spatial location of the source of light as it is directed from the diffractive output coupler 34 to the eye 18 may vary as a function of both horizontal and vertical field angle, which may also be advantageous for certain eye-tracking algorithms if properly accounted for in the algorithms. Additionally, the configuration of FIG. 4C offers two distinct positions for eye illumination that are integrated within the VL waveguide 14. Another potential advantage is that horizontal angular bandwidth may be increased while limiting beam replication, as beam replication occurs in the vertical direction. Although some field angles may couple into both the first and second diffractive output couplers 36, 38, thus limiting the fidelity of eye-tracking algorithms, correction may be possible with calibration.

Figure 4D:
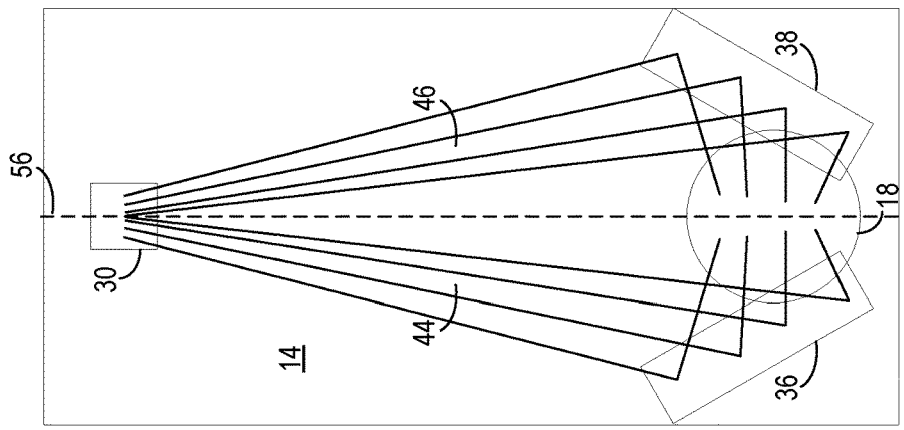

Given the arrangement described above of the first and second diffractive output couplers 36, 38, a first portion of IR light 40 in a user's field of view may couple with the first diffractive output coupler 36, and a second portion of IR light 42 in the user's field of view may couple with the second diffractive output coupler 38. FIG. 4C depicts this example implementation. Alternatively, a full field of view of a first beam of IR light 44 may couple with the first diffractive output coupler 36 and a full field of view of a second beam of IR light 46 may couple with the second diffractive output coupler 38. This implementation is shown in FIG. 4D. The configuration of FIG. 4D may allow a stereoscopic illumination capability. In order to effect this arrangement, the input power must be doubled, since the IR light beam 52 that is in-coupled is divided between two output couplers. As discussed above for the configuration of FIG. 4C, the configuration of FIG. 4D also offers two distinct positions for eye illumination that are integrated within the VL waveguide 14.

Figure 3A:
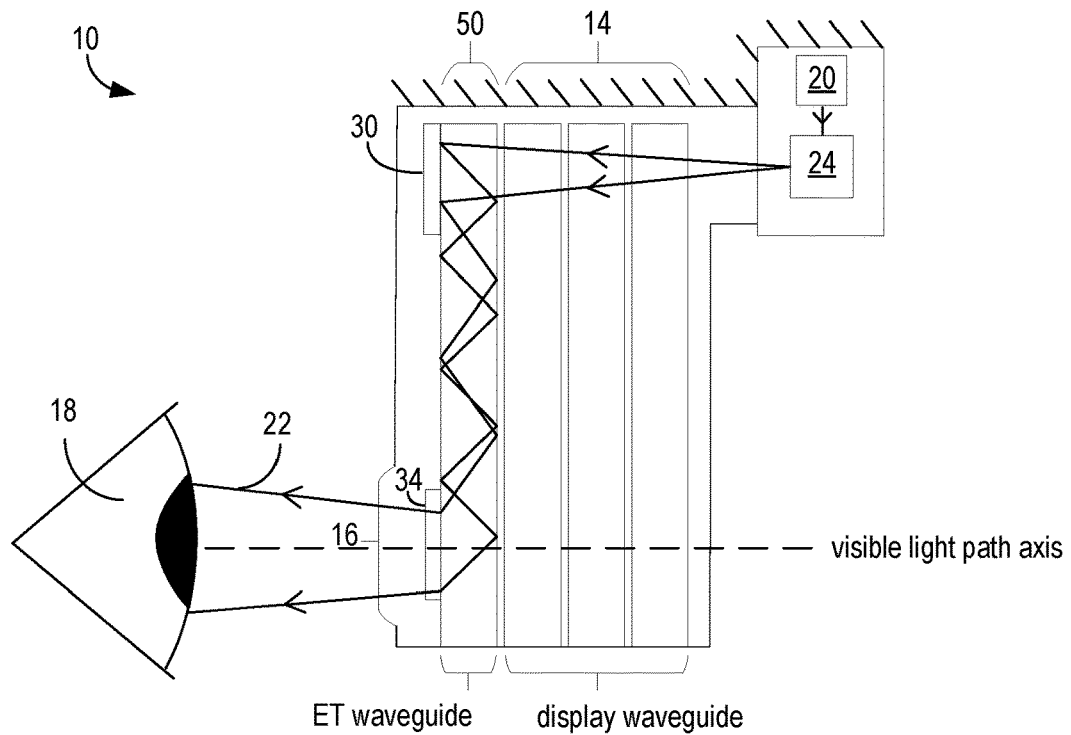
FIG. 3A is a simplified illustration of a side-view of the eye-tracking system of FIG. 1, the IR light path traversing an IR waveguide that is included in addition to visible light waveguides.
Figure 3B:
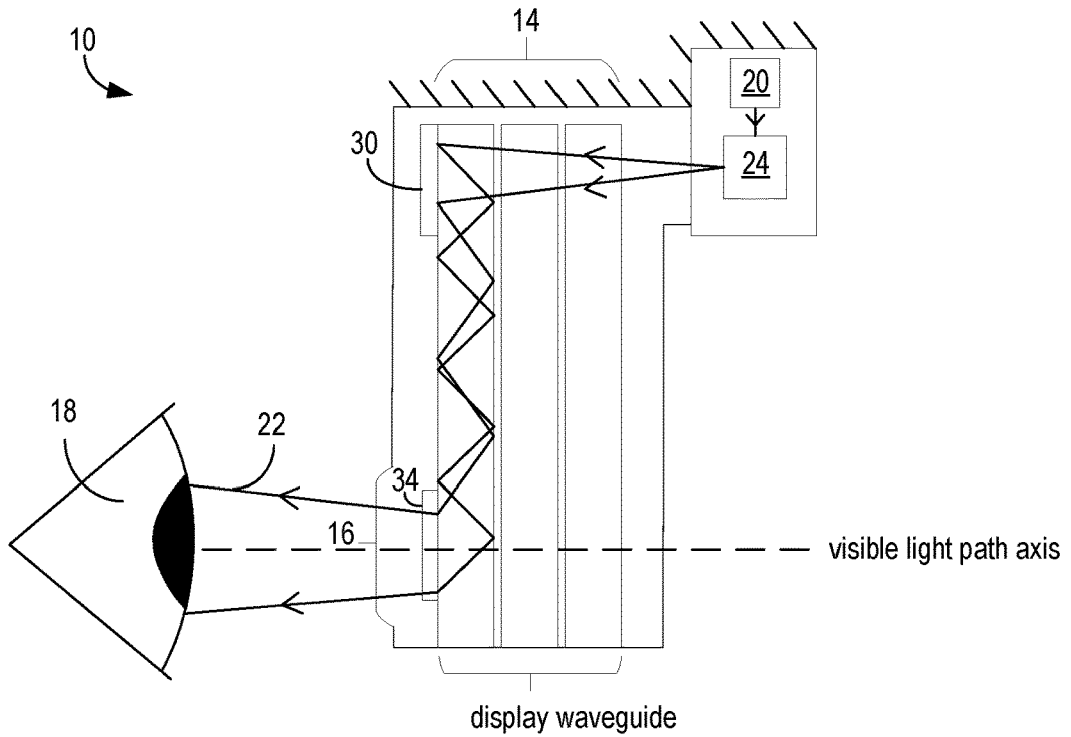
FIG. 3B is a simplified illustration of a side view of the eye-tracking system of FIG. 1, the IR light path traversing a visible light waveguide without an additional IR waveguide.

The system 10 may include an IR waveguide 50, the IR light path 22 traversing a portion of the IR waveguide 50. In some configurations, it may make for a more efficient design to utilize the VL waveguide 14 for both visible light required for a display and IR light directed for eye-tracking. Such a design, which lacks a separate IR waveguide, is depicted in FIG. 3B. Multiplexed gratings on top of display gratings may be integrated into the design. Alternatively, gratings may be moved to edges of the VL waveguide 14 and off-axis eye illumination employed. Potential advantages from utilizing this design may include fewer components, a lighter-weight eye-tracking system 10, and lower cost. However, a separate IR waveguide 50 may be composed with the VL waveguide 14 to guide the IR light separately from the visible light. This may be preferable in some implementations, as multiplexed gratings may affect efficiency of the display and off-axis eye illumination may be less efficient. As shown in FIG. 3A, the IR waveguide 50 may be positioned between the eye 18 and the VL waveguide 14. It will be appreciated that the IR waveguide 50 may be on a same side of the VL waveguide 14 as the MEMS projector 24.

The relationship between the cross-sectional area of the diffractive input coupler 30 and the cross-sectional area of the diffractive output coupler 34 may influence the final cross-sectional area 48 of the IR light beam 52 as it impinges on the eye 18. The diffractive input coupler 30 may be configured to decrease a cross-sectional area 48 of an IR light beam 52 directed by the MEMS projector 24 as the IR light beam 52 passes through the diffractive input coupler 30. At the other end of the IR light beam 52 from the diffractive input coupler 30, the diffractive output coupler 34 may be narrower than a step size 54 of the IR light path 22 in the visible light waveguide 14 in a direction parallel to the visible light waveguide 14. FIGS. 5A-5D display several example configurations by which the cross-sectional area 48 of the IR light beam 52 may be controlled. Each of these figures is a front view schematically showing the eye 18, the VL waveguide 14, the diffractive input coupler 30, and the diffractive output coupler 34. The IR light beam 52 enters the diffractive input coupler 30 in the plane of the page, such that the circle labeled as the IR light beam 52 is a cross section of the light beam. The IR light beam 52 enters the VL waveguide 14 after traveling through the diffractive input coupler 30 and traverses the VL waveguide 14 as it is directed to the diffractive output coupler 34. At the diffractive output coupler 34, the IR light beam 52 is directed out of the VL waveguide 14 and toward the eye 18.

In FIG. 5A, the diffractive input coupler 30 reduces the IR light beam 52 to the cross-sectional area 48 indicated by cross-hatching in a first cross-sectional dimension, namely in the horizontal direction as shown in the figure. The diffractive output coupler 34 further reduces the cross-sectional area 48 of the IR light beam 52 to the darkly shaded section in FIG. 5A; the cross-sectional area at the diffractive input coupler 30 is reproduced with cross-hatching at the diffractive output coupler 34 in the figure to demonstrate the further reduction in cross-sectional area 48. As shown, the diffractive output coupler 34 reduces the cross-sectional area 48 in a second cross-sectional dimension, namely the vertical direction as shown in the figure. This direction may be narrower than a step size 54 of the IR light path 22 in the visible light waveguide 14, in a direction parallel to the visible light waveguide 14. Step size 54, shown in side view in FIG. 2A, in conjunction with the cross-sectional area of the diffractive output coupler 34 influences the composition of the IR light beam 52. If the cross-section of the diffractive output coupler 34 is wider than a step size 54, multiple incidences of the IR light beam 52 may enter the diffractive output coupler 34 and result in stray images appearing to the user. Alternatively, narrowing the diffractive output coupler 34 in the vertical direction, or in general in a second cross-sectional dimension perpendicular to the first cross-sectional dimension of the diffractive input coupler 30, may cause fewer incidences of the IR light beam 52 from passing into the diffractive output coupler 34. Thus, the overall cross-sectional area 48 of the IR light beam 52 is altered.

FIG. 5B shows an example configuration where the diffractive input coupler 30 has approximately the same cross-sectional area as the incoming IR light beam 52. Subsequently, the diffractive output coupler 34 narrows the cross-sectional area 48 in a vertical direction. FIG. 5C shows a similar configuration of the diffractive input coupler 30 and IR light beam 52 as FIG. 5A; however, here the diffractive output coupler 34 is not narrowed and the cross-sectional area 48 of the IR light beam 52 may remain approximately the same as it passes through the diffractive output coupler 34. FIG. 5D displays an example configuration where neither the diffractive input coupler 30 nor the diffractive output coupler 34 significantly change the cross-sectional area 48 of the IR light beam 52. Any of the configurations shown in FIGS. 5A-5D or other combinations and variations may be employed as necessitated by the specific design or requirements of the system 10 for implementing eye-tracking.

The inventors have recognized a preferable range for the cross-sectional area 48 of the IR light beam 52 for some implementations. The diffractive input coupler 30 may be configured to narrow an IR light beam 52 at least in a first cross-sectional dimension of the IR light beam 52 to a range of 250 microns to 1 millimeter. The diffractive output coupler 34 may be configured to narrow the IR light beam 52 in a second cross-sectional dimension of the IR light beam 52 that is perpendicular to the first cross-sectional dimension in a range of 250 microns to 1 millimeter.

The cross-sectional area of the input beam from the MEMS projector 24 may also be controlled. Depending on this cross-sectional area, the cross-sectional areas of the diffractive input coupler 30 and diffractive output coupler 34 may be selected accordingly. An IR light beam diameter of the IR light directed from the MEMS projector 24 may be in a range of 500 microns to 3 millimeters. For display purposes, a larger light beam may be more advantageous, although for eye-tracking a smaller beam may be preferable. In the case of a light beam diameter that is at the lower end of a cross-sectional area range, the diffractive couplers 30, 34 may be selected to have larger cross-sectional areas. Alternatively, in the case of a light beam diameter that is at an upper end of a cross-sectional area range, the diffractive couplers 30, 34 may be selected to be more restrictive. The cross-sectional area 48 of the IR light beam 52 may thus be controlled so that when it impinges on the eye 18 its cross-sectional area is in a preferred range. An IR light beam diameter of the IR light impinging on the eye 18 of the user may be in a range of 250 microns to 1 millimeter. At the lower end of this range, iris recognition may be enabled. Iris recognition, used for the identification of a user, requires a smaller beam. At beam diameters nearing 1 millimeter, glint detection may be employed, which provides eye-tracking information and for gaze direction determination. Consequently, a potential advantage of the configurations described herein is deliberate selection of light beam diameter from the MEMS projector 24 in conjunction with cross-sectional area of the diffractive couplers for a design customized to at least specific eye recognition and tracking requirements for various systems.

In terms of potential benefits, diffractive couplers with larger cross-sectional areas may allow improved efficiency as more IR light passes to the eye 18. However, eye-tracking accuracy may decrease due to more incidences or replications of the IR light beam entering the diffractive output coupler 34, and ghost images may result. Conversely, reducing cross-sectional beam size via the diffractive couplers may improve eye-tracking accuracy and reduce the possibility of ghost images, although less light is available and eye-tracking efficiency may drop. Other factors, such as diffraction grating periods, may be adjusted to accommodate preferred cross-sectional area 48 of the IR light beam 52 while controlling for step size 54 and beam replication. A smaller input beam from the MEMS projector 24 may also improve eye-tracking accuracy but decrease efficiency as well. A larger light beam may be preferable for display purposes, and alignment tolerance within the system 10 may be reduced since a larger beam is more easily aimed at the diffraction grating. Given this, a larger input beam from the MEMS projector 24 may be generated for the visible light display, while the cross-sectional area 48 of the IR light beam 52 may be controlled by way of the diffractive input and output couplers 30, 34 as discussed.

Figure 6A:
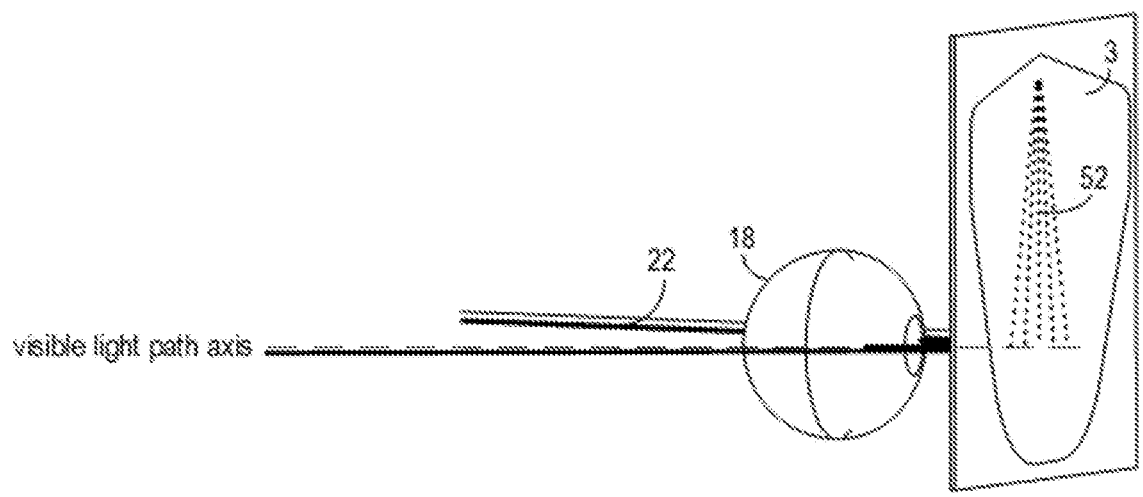
FIGS. 6A-6C show one configuration in three side-views of the output coupler positioned on the waveguide such that the horizontal angular bandwidth is increased, the IR light path directed toward the eye.
Figure 6B:
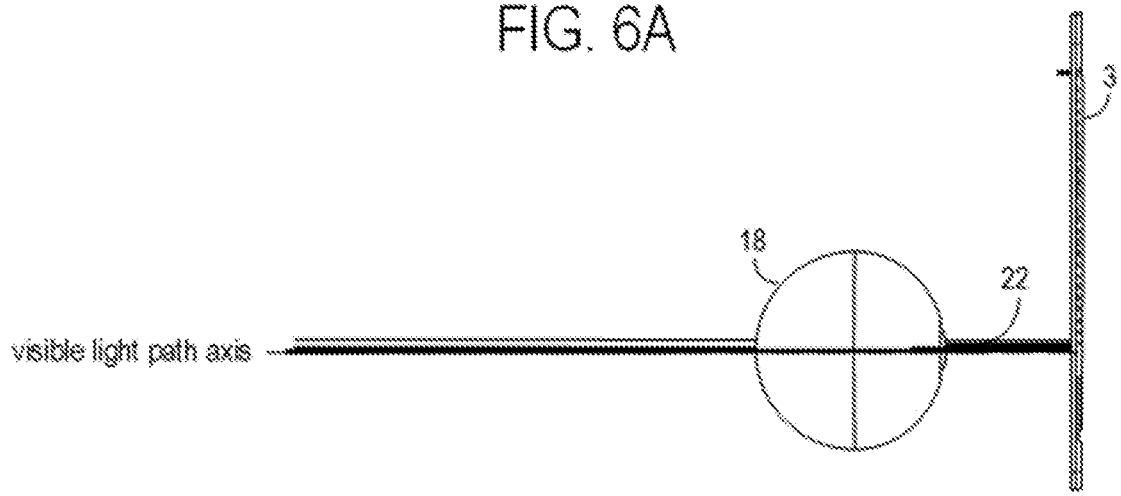
Figure 6C:
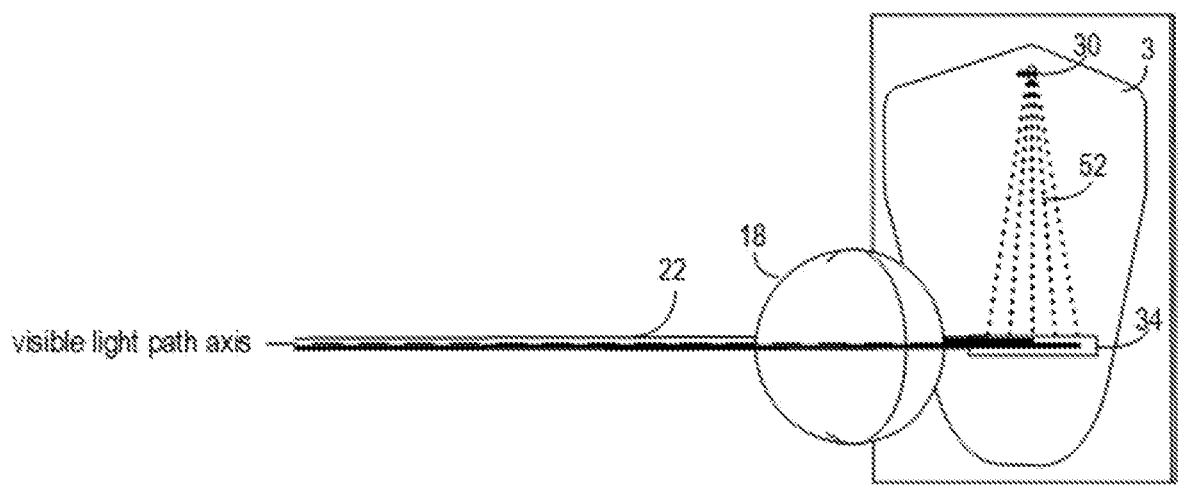

FIGS. 6A-6C give a three-dimensional rendering of the display device 3 including the IR light beam 52, the IR light path 22, and the eye 18. As discussed above, the display device 3 may be included in an HMD device 1. In FIG. 6A, the eye 18 is turned slightly toward the user's right, showing the back side of the display device 3. In this configuration, the IR light path 22 is in line with the visible light axis as it impinges on the eye 18. FIG. 6B shows a profile view of the configuration of FIG. 6A. In FIG. 6C, the eye 18 is turned slightly toward the user's left, showing the front side of the display device 3. Included in this view are the diffractive input coupler 30 and the diffractive output coupler 34. The arrangement of the diffractive couplers 30, 34 is similar to that of FIG. 4B.

Figure 7A:
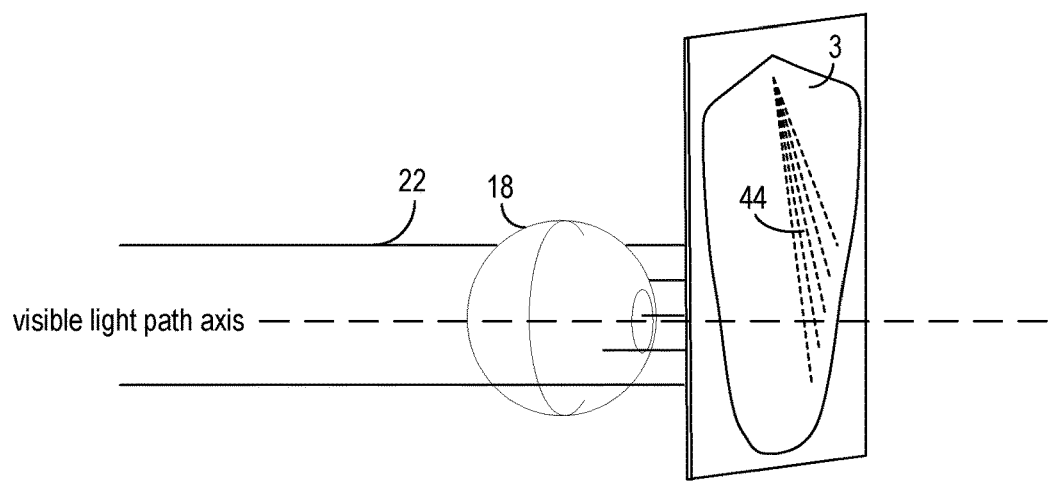
FIGS. 7A-7C show one configuration in three side-views of the output coupler positioned on the waveguide such that the horizontal angular bandwidth and vertical angular bandwidth are increased, the IR light path directed toward the eye.
Figure 7B:
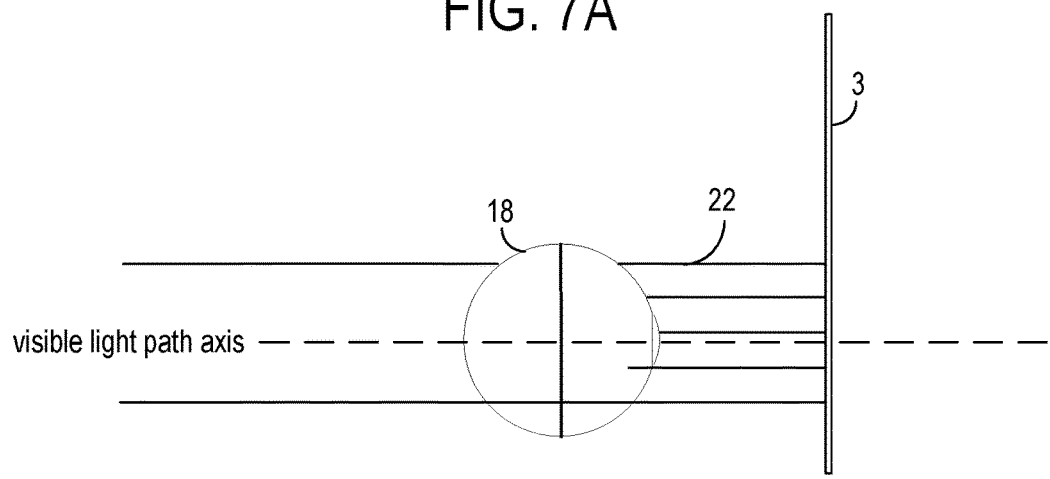
Figure 7C:
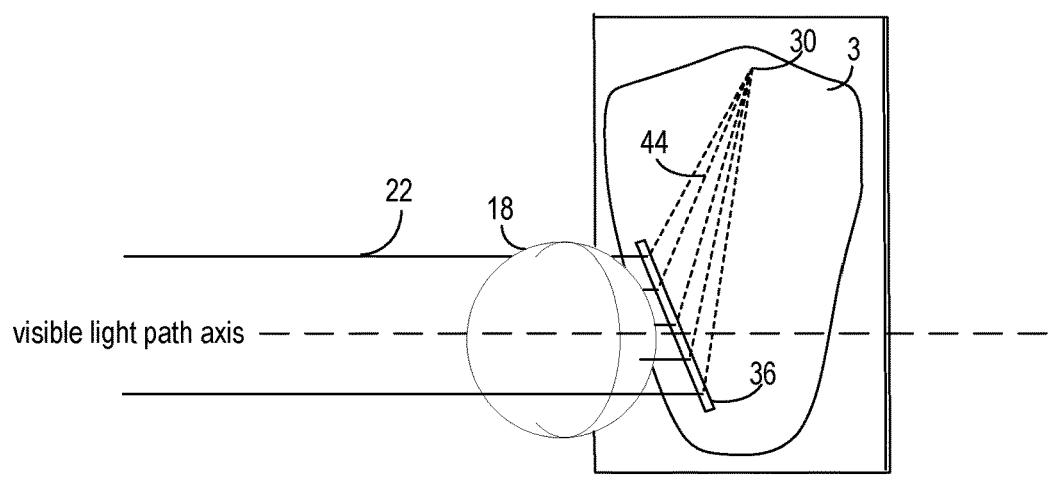

FIGS. 7A-7B are similar to FIGS. 6A-6B except that the arrangement of the diffractive couplers 30, 34 is similar to that of FIG. 4D, shown with only the first diffractive output coupler 36 and the first beam of IR light 44 for the sake of simplicity. FIG. 7A is again a side view with the eye 18 turned slightly toward the user's right; FIG. 7B is a profile of FIG. 7A; and FIG. 7C is a side view with the eye 18 turned slightly toward the user's left. In this configuration, the IR light path 22 is on a diagonal compared to the visible light path axis.

Figure 8A:
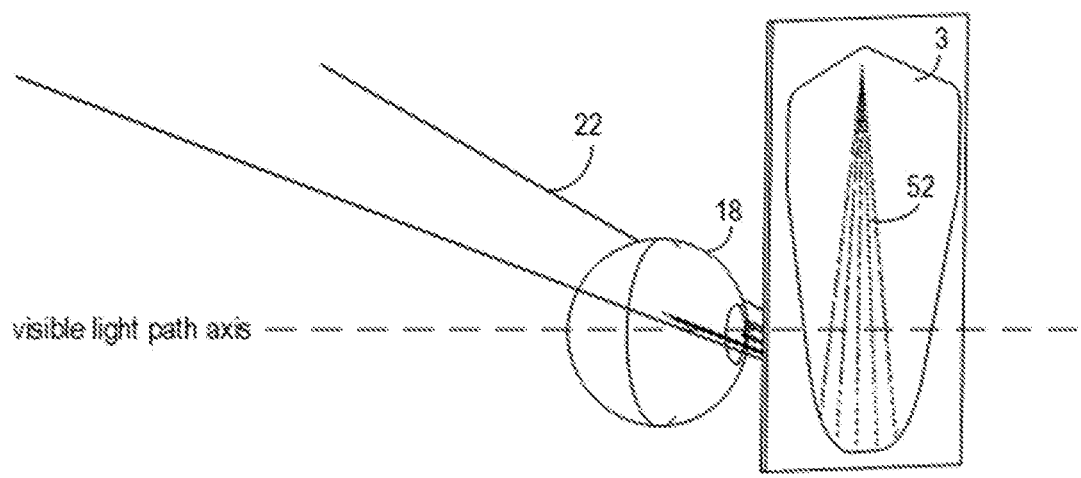
FIGS. 8A-8C show one configuration in three side-views of the output coupler positioned on the waveguide, the IR light path directed toward the eye off-axis relative to an axis of the visible light emitted from the visible light waveguide.
Figure 8B:
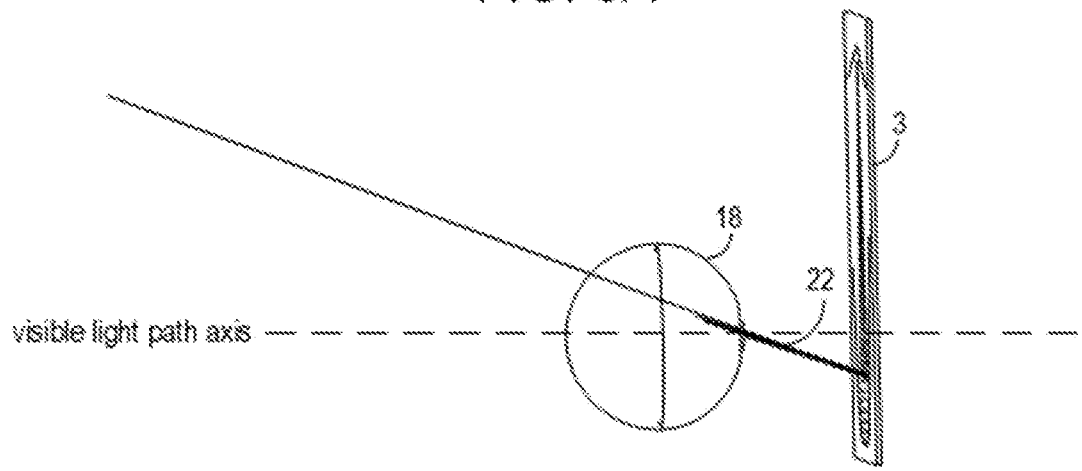
Figure 8C:
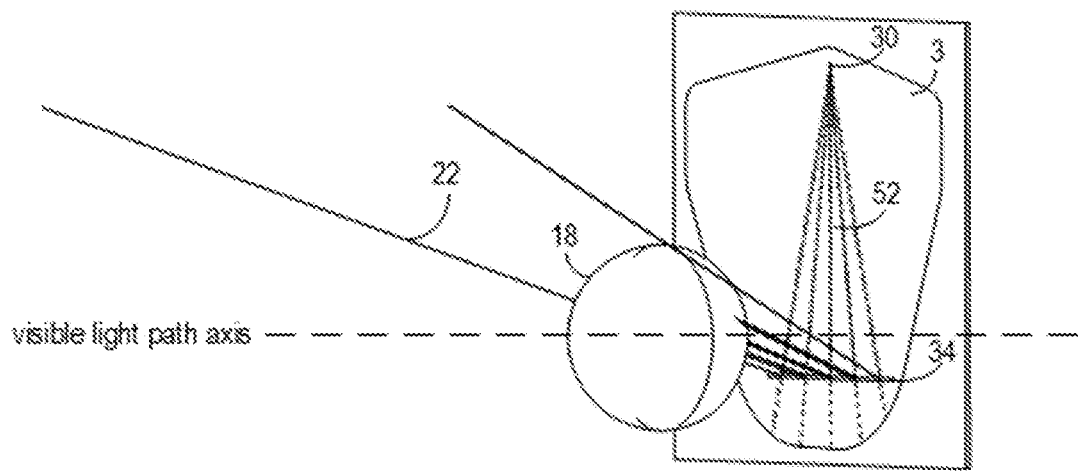

The IR light beam 52 of the IR light impinging on the eye 18 of the user may be off-axis relative to an axis of the visible light emitted from the visible light waveguide 14 as it impinges on the eye 18. FIGS. 8A-8C depict this configuration and are similar to FIGS. 6A-6C except that the IR light path 22 followed by the IR light beam 52 is off-axis compared to the visible light path axis, as shown. The IR light beam 52 may exit the diffractive output coupler 34 above or below the exit region of visible light from the display region 16; this may depend on placing the diffractive output coupler 34 at a boundary of the VL waveguide 14 not used for display. In such a configuration, the IR light path 22 of IR light impinging on the eye 18 of the user will be angled compared to the visible light path axis. It will be appreciated that for some applications or eye-tracking algorithms, this configuration may be advantageous.

Figure 10:
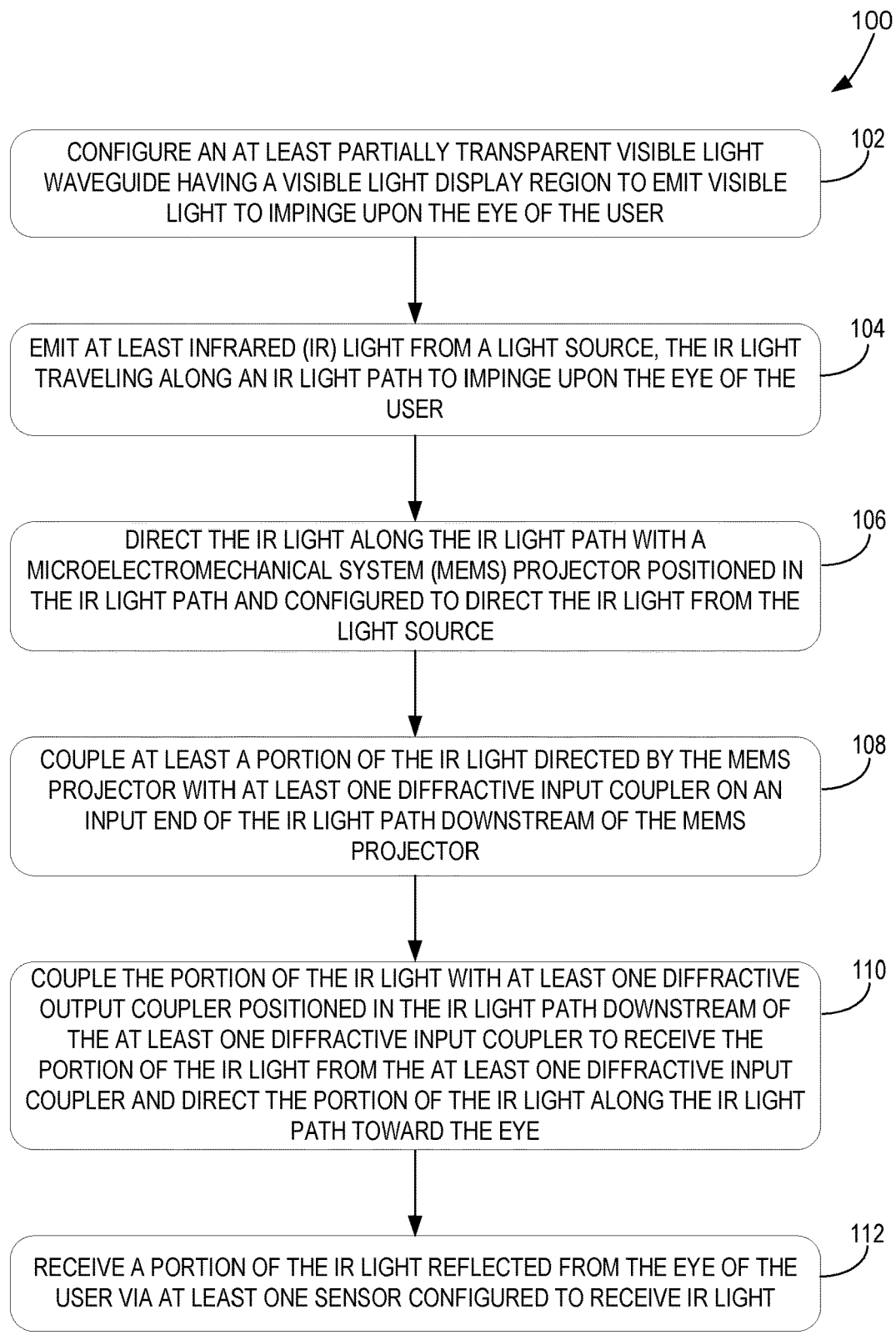
FIG. 10 is a flowchart of a method of illuminating an eye of a user with the eye-tracking system of FIGS. 2A-2B.

FIG. 10 shows a flowchart of a method 100 of illuminating an eye 18 of a user with an eye-tracking system 10. The following description of method 100 is provided with reference to the eye-tracking systems described above and shown in FIGS. 2A-8C. It will be appreciated that method 100 may also be performed in other contexts using other suitable components.

With reference to FIG. 10, at 102, the method 100 may include configuring an at least partially transparent visible light waveguide 14 having a visible light display region 16 to emit visible light to impinge upon the eye 18 of the user. The method 100 at 104 may include emitting at least infrared (IR) light from a light source 20, the IR light traveling along an IR light path 22 to impinge upon the eye 18 of the user. At 106, the method 100 may include directing the IR light along the IR light path 22 with a microelectromechanical system (MEMS) projector 24 positioned in the IR light path 22 and configured to direct the IR light from the light source 20.

The method 100 at 108 may include coupling at least a portion of the IR light directed by the MEMS projector 24 with at least one diffractive input coupler 30 on an input end 32 of the IR light path 22 downstream of the MEMS projector 24. At 110, the method 100 may include coupling the portion of the IR light with at least one diffractive output coupler 34 positioned in the IR light path 22 downstream of the at least one diffractive input coupler 30 to receive the portion of the IR light from the at least one diffractive input coupler 30 and direct the portion of the IR light along the IR light path 22 toward the eye 18. The method 100 at 112 may include receiving a portion of the IR light reflected from the eye 18 of the user via at least one sensor 26 configured to received IR light.

As described above, the at least one diffractive output coupler 34 may extend in a horizontal direction across the visible light waveguide 14, such that horizontal angular bandwidth is increased after the portion of the IR light passes through the at least one diffractive output coupler.

As also described above, the at least one diffractive output coupler 34 may be a first diffractive output coupler 36. The method 100 may further comprise coupling the portion of the IR light at least in part with a second diffractive output coupler 38, the second diffractive output coupler 38 composed with the first diffractive output coupler 36. The first and second diffractive output couplers 36, 38 may occupy a plane. A first end of each diffractive output coupler 36, 38 may be proximate to a center axis 56 of the visible light waveguide 14. A second end of each diffractive output coupler 36, 38 may be rotated at an angle to the center axis 56 of the visible light waveguide 14. In this arrangement, horizontal angular bandwidth and vertical angular bandwidth may be increased after the portion of the IR light passes through the first and second diffractive output couplers 36, 38, as detailed above.

A first portion of IR light 40 in a user's field of view may couple with the first diffractive output coupler 36, and a second portion of IR light 42 in the user's field of view may couple with the second diffractive output coupler 38. In an alternative arrangement, a full field of view of a first beam of IR light 44 may couple with the first diffractive output coupler 36. A full field of view of a second beam of IR light 46 may couple with the second diffractive output coupler 38.

Sharing an optical path between the eye-tracking system 10 and the visible light display system, for example in an HMD device 1, may streamline the device by reducing hardware and allowing for a design with a smaller footprint. This may be accomplished by utilizing a VL waveguide already present in the device, or alternatively by including an IR waveguide to direct light otherwise coincident with the visible light path. Adjusting components may create a design-specific eye-tracking system through selection of light beam diameter and diffractive coupler cross-sections as well as placement of components within the system. These choices may be driven by or accommodate various eye-tracking algorithms as well as design and engineering considerations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
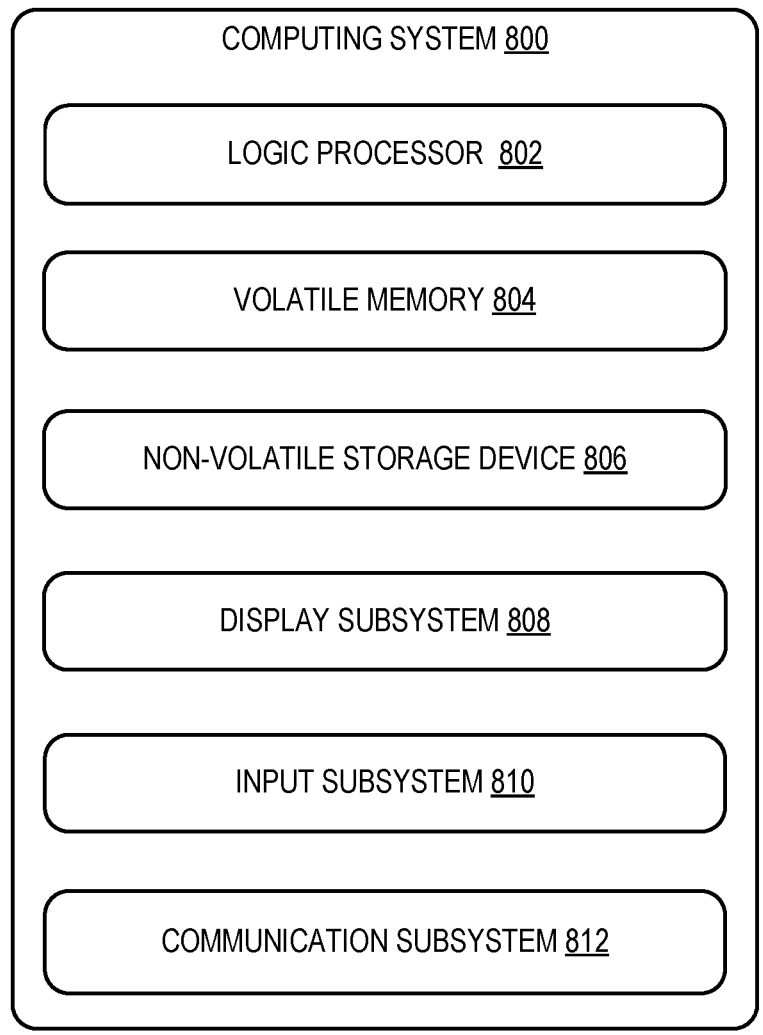
FIG. 11 is an example computing system according to an embodiment of the present description.

FIG. 11 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 11.

Logic processor 802 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. Additionally or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 800 typically implemented in software by a processor to perform a particular function using portions of volatile memory, which function involves transformative processing that specially configures the processor to perform the function. Thus, a program may be instantiated via logic processor 802 executing instructions held by non-volatile storage device 806, using portions of volatile memory 804. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 808 may be used to present a visual representation of data held by non-volatile storage device 806. This visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology; however, one utilizing a MEMS projector to direct laser light may be compatible with the eye-tracking system in a compact manner. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional support for the claims of the subject application. One aspect provides an eye-tracking system, comprising an at least partially transparent visible light waveguide having a visible light display region configured to emit visible light to impinge upon an eye of a user. A light source is configured to emit at least infrared (IR) light that travels along an IR light path to impinge upon the eye of the user. A microelectromechanical system (MEMS) projector is positioned in the IR light path and is configured to direct the IR light along the IR light path. At least one diffractive input coupler is on an input end of the IR light path downstream of the MEMS projector to diffract at least a portion of the IR light directed by the MEMS projector. At least one diffractive output coupler is positioned in the IR light path downstream of the at least one diffractive input coupler to receive the portion of the IR light from the at least one diffractive input coupler and direct the portion of the IR light along the IR light path toward the eye. At least one sensor is configured to receive the IR light after being reflected by the eye.

In this aspect, additionally or alternatively, the light source may be positioned on an opposite side of the display region from the eye of the user, and a portion of the IR light path may traverse a portion of the visible light waveguide. In this aspect, additionally or alternatively, the light source may be positioned on a same side of the display region as the eye of the user, and a portion of the IR light path may traverse a portion of the visible light waveguide. In this aspect, additionally or alternatively, the at least one diffractive output coupler may extend in a horizontal direction across the visible light waveguide, such that horizontal angular bandwidth may be increased after the portion of the IR light passes through the at least one diffractive output coupler.

In this aspect, additionally or alternatively, the at least one diffractive output coupler may be a first diffractive output coupler. The eye-tracking system may further comprise a second diffractive output coupler. The first and second diffractive output couplers may occupy a plane. A first end of each diffractive output coupler may be proximate to a center axis of the visible light waveguide. A second end of each diffractive output coupler may be rotated at an angle to the center axis of the visible light waveguide, such that horizontal angular bandwidth and vertical angular bandwidth may be increased after the portion of the IR light passes through the first and second diffractive output couplers.

In this aspect, additionally or alternatively, a first portion of IR light in a user's field of view may couple with the first diffractive output coupler and a second portion of IR light in the user's field of view may couple with the second diffractive output coupler. In this aspect, additionally or alternatively, a full field of view of a first beam of IR light may couple with the first diffractive output coupler and a full field of view of a second beam of IR light may couple with the second diffractive output coupler. In this aspect, additionally or alternatively, the eye-tracking system may further comprise an IR waveguide; the IR light path may traverse a portion of the IR waveguide.

In this aspect, additionally or alternatively, the at least one diffractive input coupler may be configured to decrease a cross-sectional area of an IR light beam directed by the MEMS projector as the IR light beam passes through the diffractive input coupler. In this aspect, additionally or alternatively, the at least one diffractive output coupler may be narrower than a step size of the IR light path in the visible light waveguide in a direction parallel to the visible light waveguide. In this aspect, additionally or alternatively, an IR light beam diameter of the IR light directed from the MEMS projector may be in a range of 500 microns to 2 millimeters.

In this aspect, additionally or alternatively, an IR light beam diameter of the IR light impinging upon the eye of the user may be in a range of 250 microns to 1 millimeter. In this aspect, additionally or alternatively, the diffractive input coupler may be configured to narrow an IR light beam at least in a first cross-sectional dimension of the IR light beam to a range of 250 microns to 1 millimeter, and the diffractive output coupler may be configured to narrow the IR light beam at least in a second cross-sectional dimension of the IR light beam that may be perpendicular to the first cross-sectional dimension in a range of 250 microns to 1 millimeter. In this aspect, additionally or alternatively, an IR light beam of the IR light impinging upon the eye of the user may be off-axis relative to an axis of the visible light emitted from the visible light waveguide as it impinges upon the eye.

Another aspect provides a method of illuminating an eye of a user with an eye-tracking system, the method comprising configuring an at least partially transparent visible light waveguide having a visible light display region to emit visible light to impinge upon the eye of the user. At least infrared (IR) light is emitted from a light source, the IR light traveling along an IR light path to impinge upon the eye of the user. The IR light is directed along the IR light path with a microelectromechanical system (MEMS) projector positioned in the IR light path and configured to direct the IR light from the light source. At least a portion of the IR light directed by the MEMS projector is coupled with at least one diffractive input coupler on an input end of the IR light path downstream of the MEMS projector. The portion of the IR light is coupled with at least one diffractive output coupler positioned in the IR light path downstream of the at least one diffractive input coupler to receive the portion of the IR light from the at least one diffractive input coupler and direct the portion of the IR light along the IR light path toward the eye. A portion of the IR light reflected from the eye of the user is received via at least one sensor configured to receive IR light.

In this aspect, additionally or alternatively, the at least one diffractive output coupler may extend in a horizontal direction across the visible light waveguide, such that horizontal angular bandwidth may be increased after the portion of the IR light passes through the at least one diffractive output coupler. In this aspect, additionally or alternatively, the at least one diffractive output coupler may be a first diffractive output coupler. The method may further comprise coupling the portion of the IR light at least in part with a second diffractive output coupler. The first and second diffractive output couplers may occupy a plane. A first end of each diffractive output coupler may be proximate to a center axis of the visible light waveguide. A second end of each diffractive output coupler may be rotated at an angle to the center axis of the visible light waveguide, such that horizontal angular bandwidth and vertical angular bandwidth may be increased after the portion of the IR light passes through the first and second diffractive output couplers.

In this aspect, additionally or alternatively, a first portion of IR light in a user's field of view may couple with the first diffractive output coupler and a second portion of IR light in the user's field of view may couple with the second diffractive output coupler. In this aspect, additionally or alternatively, a full field of view of a first beam of IR light may couple with the first diffractive output coupler and a full field of view of a second beam of IR light may couple with the second diffractive output coupler.

Another aspect provides an eye-tracking system, comprising an at least partially transparent visible light waveguide having a visible light display region configured to emit visible light to impinge upon an eye of a user. A light source is configured to emit at least infrared (IR) light that travels along an IR light path to impinge upon the eye of the user. A microelectromechanical system (MEMS) projector is positioned in the IR light path and is configured to direct the IR light along the IR light path. At least one diffractive input coupler is on an input end of the IR light path downstream of the MEMS projector to diffract at least a portion of the IR light directed by the MEMS projector. At least one diffractive output coupler is positioned in the IR light path downstream of the at least one diffractive input coupler to receive the portion of the IR light from the at least one diffractive input coupler and direct the portion of the IR light along the IR light path toward the eye. At least one sensor is configured to receive the IR light after being reflected by the eye. The at least one diffractive input coupler is configured to decrease a cross-sectional area of an IR light beam directed by the MEMS projector as the IR light beam passes though the diffractive input coupler. The at least one diffractive output coupler is narrower than a step size of the IR light path in the visible light waveguide in a direction parallel to the visible light waveguide.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An eye-tracking system, comprising:
   an at least partially transparent visible light waveguide having a visible light display region configured to emit visible light to impinge upon an eye of a user;
   a light source being configured to emit at least infrared (IR) light that travels along an IR light path to impinge upon the eye of the user;
   a microelectromechanical system (MEMS) projector positioned in the IR light path and configured to direct the IR light along the IR light path;
   at least one diffractive input coupler on an input end of the IR light path downstream of the MEMS projector to diffract at least a portion of the IR light directed by the MEMS projector, wherein the at least one diffractive input coupler is configured to narrow an IR light beam at least in a first cross-sectional dimension of the IR light beam;
   at least one diffractive output coupler positioned in the IR light path downstream of the at least one diffractive input coupler and upstream of the eye to receive the portion of the IR light from the at least one diffractive input coupler and direct the portion of the IR light along the IR light path toward the eye, wherein the at least one diffractive output coupler is configured to narrow the IR light beam at least in a second cross-sectional dimension of the IR light beam that is perpendicular to the first cross-sectional dimension; and
   at least one sensor configured to receive the IR light after being reflected by the eye.

2. The eye-tracking system of claim 1, wherein the light source is positioned on an opposite side of the display region from the eye of the user, and a portion of the IR light path traverses a portion of the visible light waveguide.

3. The eye-tracking system of claim 1, wherein the light source is positioned on a same side of the display region as the eye of the user, and a portion of the IR light path traverses a portion of the visible light waveguide.

4. The eye-tracking system of claim 1, wherein the at least one diffractive output coupler extends in a horizontal direction across the visible light waveguide, such that horizontal angular bandwidth is increased after the portion of the IR light passes through the at least one diffractive output coupler.

5. An eye-tracking system, comprising:
   an at least partially transparent visible light waveguide having a visible light display region configured to emit visible light to impinge upon an eye of a user;
   a light source being configured to emit at least infrared (IR) light that travels along an IR light path to impinge upon the eye of the user;
   a microelectromechanical system (MEMS) projector positioned in the IR light path and configured to direct the IR light along the IR light path;
   at least one diffractive input coupler on an input end of the IR light path downstream of the MEMS projector to diffract at least a portion of the IR light directed by the MEMS projector;
   at least one diffractive output coupler positioned in the IR light path downstream of the at least one diffractive input coupler and upstream of the eye to receive the portion of the IR light from the at least one diffractive input coupler and direct the portion of the IR light along the IR light path toward the eye;
   at least one sensor configured to receive the IR light after being reflected by the eye, wherein the at least one diffractive output coupler is a first diffractive output coupler
   a second diffractive output coupler, wherein the first and second diffractive output couplers occupy a plane, a first end of each diffractive output coupler is proximate to a center axis of the visible light waveguide, and a second end of each diffractive output coupler at an angle to the center axis of the visible light waveguide, such that horizontal angular bandwidth and vertical angular bandwidth are increased after the portion of the IR light passes through the first and second diffractive output couplers, and the at least one diffractive input coupler is configured to narrow an IR light beam at least in a first cross-sectional dimension of the IR light beam; and the at least one diffractive output coupler is configured to narrow the IR light beam at least in a second cross-sectional dimension of the IR light beam that is perpendicular to the first cross-sectional dimension.

6. The eye-tracking system of claim 5, wherein a first portion of IR light in a user's field of view couples with the first diffractive output coupler and a second portion of IR light in the user's field of view couples with the second diffractive output coupler.

7. The eye-tracking system of claim 5, wherein a full field of view of a first beam of IR light couples with the first diffractive output coupler and a full field of view of a second beam of IR light couples with the second diffractive output coupler.

8. The eye-tracking system of claim 1, further comprising an IR waveguide, the IR light path traversing a portion of the IR waveguide.

9. The eye-tracking system of claim 1, wherein the at least one diffractive input coupler is configured to decrease a cross-sectional area of an IR light beam directed by the MEMS projector as the IR light beam passes through the diffractive input coupler.

10. The eye-tracking system of claim 1, wherein the at least one diffractive output coupler is narrower than a step size of the IR light path in the visible light waveguide in a direction parallel to the visible light waveguide.

11. The eye-tracking system of claim 1, wherein an IR light beam diameter of the IR light directed from the MEMS projector is in a range of 500 microns to 2 millimeters.

12. The eye-tracking system of claim 1, wherein an IR light beam diameter of the IR light impinging upon the eye of the user is in a range of 250 microns to 1 millimeter.

13. The eye-tracking system of claim 1, wherein the diffractive input coupler is configured to narrow the IR light beam at least in the first cross-sectional dimension of the IR light beam to a range of 250 microns to 1 millimeter, and the diffractive output coupler is configured to narrow the IR light beam at least in the second cross-sectional dimension of the IR light beam that is perpendicular to the first cross-sectional dimension in the range of 250 microns to 1 millimeter.

14. The eye-tracking system of claim 1, wherein an IR light beam of the IR light impinging upon the eye of the user is off-axis relative to an axis of the visible light emitted from the visible light waveguide as it impinges upon the eye.

15. A method of illuminating an eye of a user with an eye-tracking system, the method comprising:
configuring an at least partially transparent visible light waveguide having a visible light display region to emit visible light to impinge upon the eye of the user;
emitting at least infrared (IR) light from a light source, the IR light traveling along an IR light path to impinge upon the eye of the user;
directing the IR light along the IR light path with a microelectromechanical system (MEMS) projector positioned in the IR light path and configured to direct the IR light from the light source;
coupling at least a portion of the IR light directed by the MEMS projector with at least one diffractive input coupler on an input end of the IR light path downstream of the MEMS projector, wherein the at least one diffractive input coupler is configured to narrow an IR light beam at least in a first cross-sectional dimension of the IR light beam;
coupling the portion of the IR light with at least one diffractive output coupler positioned in the IR light path downstream of the at least one diffractive input coupler and upstream of the eye to receive the portion of the IR light from the at least one diffractive input coupler and direct the portion of the IR light along the IR light path toward the eye, wherein the at least one diffractive output coupler is configured to narrow the IR light beam at least in a second cross-sectional dimension of the IR light beam that is perpendicular to the first cross-sectional dimension; and
receiving a portion of the IR light reflected from the eye of the user via at least one sensor configured to receive IR light.

16. The method of claim 15, wherein the at least one diffractive output coupler extends in a horizontal direction across the visible light waveguide, such that horizontal angular bandwidth is increased after the portion of the IR light passes through the at least one diffractive output coupler.

17. The method of claim 15, wherein the at least one diffractive output coupler is a first diffractive output coupler, further comprising coupling the portion of the IR light at least in part with a second diffractive output coupler, the first and second diffractive output couplers occupying a plane, a first end of each diffractive output coupler proximate to a center axis of the visible light waveguide, and a second end of each diffractive output coupler rotated at an angle to the center axis of the visible light waveguide, such that horizontal angular bandwidth and vertical angular bandwidth are increased after the portion of the IR light passes through the first and second diffractive output couplers.

18. The method of claim 17, wherein a first portion of IR light in a user's field of view couples with the first diffractive output coupler and a second portion of IR light in the user's field of view couples with the second diffractive output coupler.

19. The method of claim 17, wherein a full field of view of a first beam of IR light couples with the first diffractive output coupler and a full field of view of a second beam of IR light couples with the second diffractive output coupler.

* * * * *